United States Patent

Kurosaka et al.

[11] Patent Number: 5,955,815
[45] Date of Patent: Sep. 21, 1999

[54] STATOR OF DIRECT DRIVE MOTOR

[75] Inventors: Toshinori Kurosaka; Hisateru Komatsu; Yoshimi Hanaika, all of Yamagata, Japan

[73] Assignee: Mitsumi Electric, Co., Ltd., Tokyo, Japan

[21] Appl. No.: 09/083,085

[22] Filed: May 22, 1998

[30] Foreign Application Priority Data

May 23, 1997 [JP] Japan ................................ 9-150021

[51] Int. Cl.$^6$ ........................................... H02K 1/12

[52] U.S. Cl. .................... 310/258; 310/259; 310/216; 310/217; 310/218; 310/91; 310/67 R

[58] Field of Search ................... 310/258, 259, 310/216, 217, 218, 91, 67 R

[56] References Cited

U.S. PATENT DOCUMENTS 5,461,271 10/1995 Asama et al. ........................ 310/91

Primary Examiner—Thomas M. Dougherty
Assistant Examiner—Thanh Lam
Attorney, Agent, or Firm—Whitham, Curtis & Whitham

[57] ABSTRACT

A stator of a direct drive motor is disclosed. The stator comprises a supporting member which supports a central portion of the stator, a first core including a mounting section and a magnetic pole section, a fixing member fixing the first core onto the supporting member through the mounting section of the first core, and a second core mounted on an upper surface of the first core, the second core including a magnetic pole section and a hole section disposed on the mounting section of the first core, wherein an upper end of the fixing member is lower than an upper face of the second core.

5 Claims, 2 Drawing Sheets

STATOR OF DIRECT DRIVE MOTOR

BACKGROUND OF THE INVENTION

1. Technical Field of the Invention

The present invention relates to a direct drive motor wherein a rotary shaft of a rotor is directly connected with a body to be driven such as a turn table. More particularly, the present invention relates to improvements in the mounting structure of a stator used in the direct drive motor.

2. Background of the Related Art

A disk driver for rotating a disk such as a floppy disk, which will be referred to as FD hereinafter, includes a turn table for rotating FD, and a motor which is a drive source to drive the turn table. The mainstream of the motor used for the above object is a direct drive motor in which a rotary shaft of the rotor is directly connected with the turn table.

FIG. 3 is a partially cross-sectional view of direct drive motor used for a conventional disk driver. In the drawing, reference numeral 1 is an annular stator. In this stator 1, there are provided a plurality of cores 2 which are laminated on each other, and magnetic poles are formed like a spur gear in the plurality of cores 2. A winding wires 3 are provided about the magnetic pole section 10 of the stator 1. At the center of the stator 1, there is provided a mounting section 20. This mounting section 20 is fixed to a step portion of the support section (a bearing or a housing) 4 by screws 5. Reference numeral 6 is a printed board, which is fixed to a main frame (not shown).

At the center of the bearing 4, there is formed a through-hole 7, into which a rotary shaft (not shown) is inserted, and this rotary shaft directly connects a rotor (not shown) opposed to an upper portion of the stator 1, with a turn table (not shown) opposed to a lower portion of the printed board 6.

In order to reduce the size of an apparatus into which this type disk driver is incorporated, there is a requirement of decreasing the thickness of the disk driver. However, according to the conventional mounting structure shown in FIG. 3, head portions of the fixing screws 5 are protruding from an upper surface of the laminated core 2. Therefore, it is difficult for the stator and rotor to be arranged so close to each other. For the above reasons, it is impossible to decrease the thickness of the disk driver.

SUMMARY OF THE INVENTION

It is an object of the present invention to provide a direct drive motor, the entire thickness of which can be decreased by reducing a clearance formed between the rotor and stator.

The above object of the present invention can be accomplished by providing a stator of a direct drive motor comprises a supporting member which supports a central portion of the stator, a first core including a mounting section and a magnetic pole section, a fixing member fixing the first core onto the supporting member through the mounting section of the first core, and a second core mounted on an upper surface of the first core, the second core including a magnetic pole section and a hole section disposed on the mounting section of the first core, wherein an upper end of the fixing member is lower than an upper face of the second core.

DETAILED DESCRIPTION OF THE PREFERRED EMBODIMENT

Referring to an embodiment shown in the accompanying drawing, the present invention will be described in detail.

Figure 1:
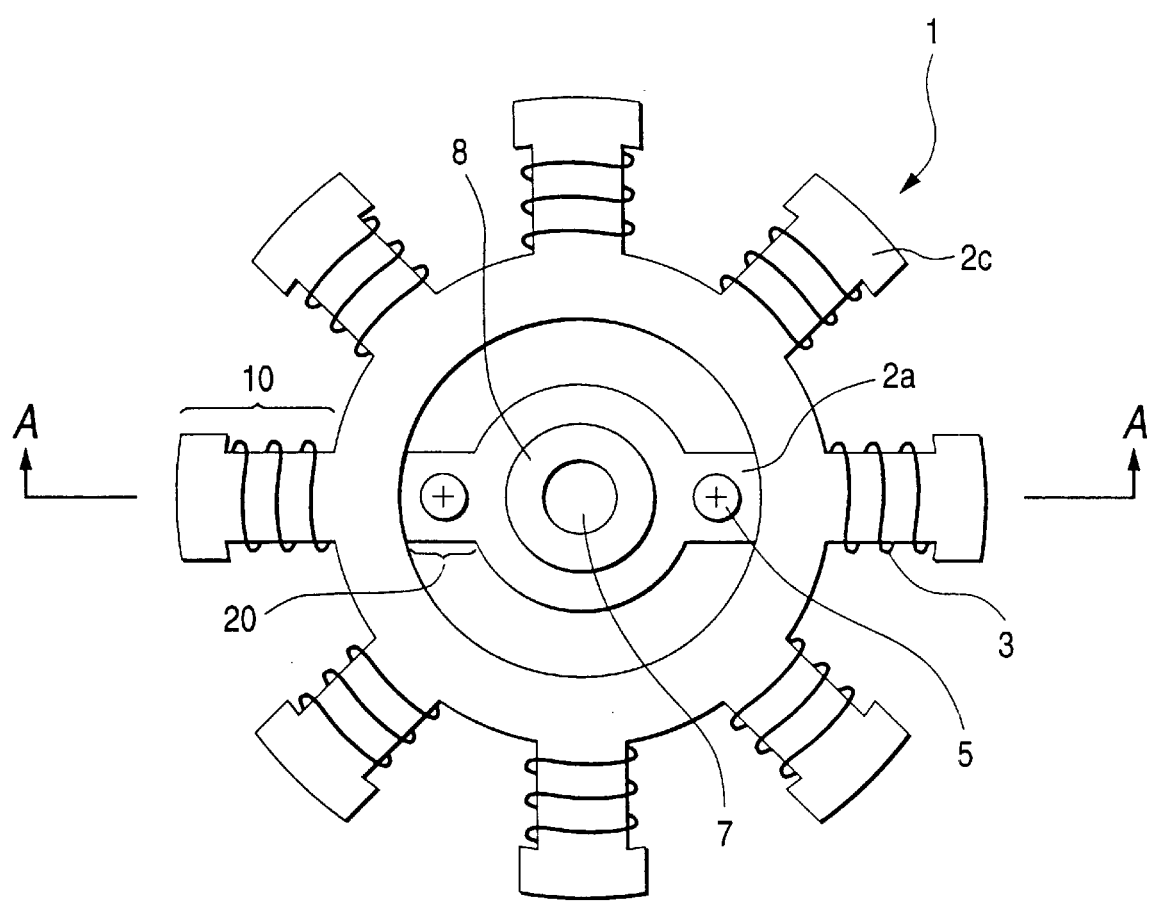
FIG. 1 is a top plan view showing an embodiment of the present invention.
Figure 2:
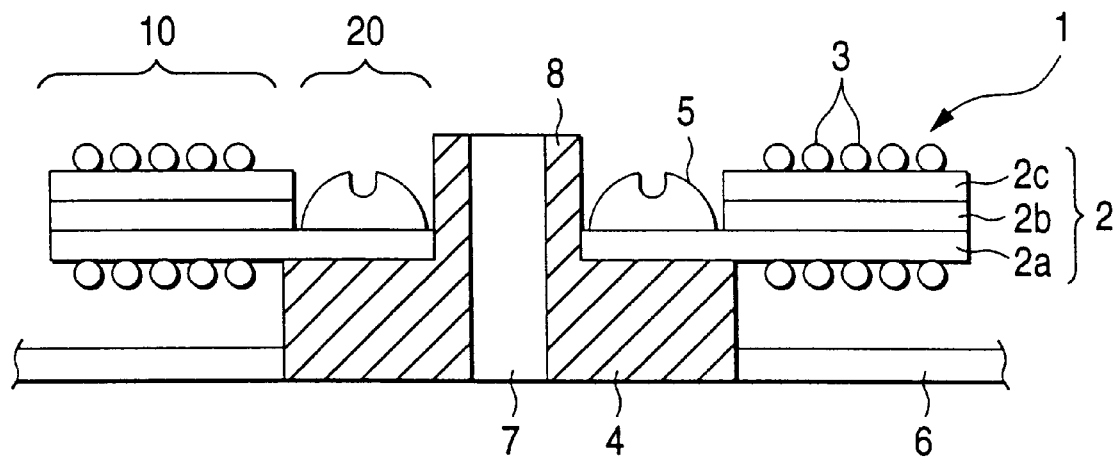
FIG. 2 is a cross-sectional view taken along the line A—A of FIG. 1.
Figure 3:
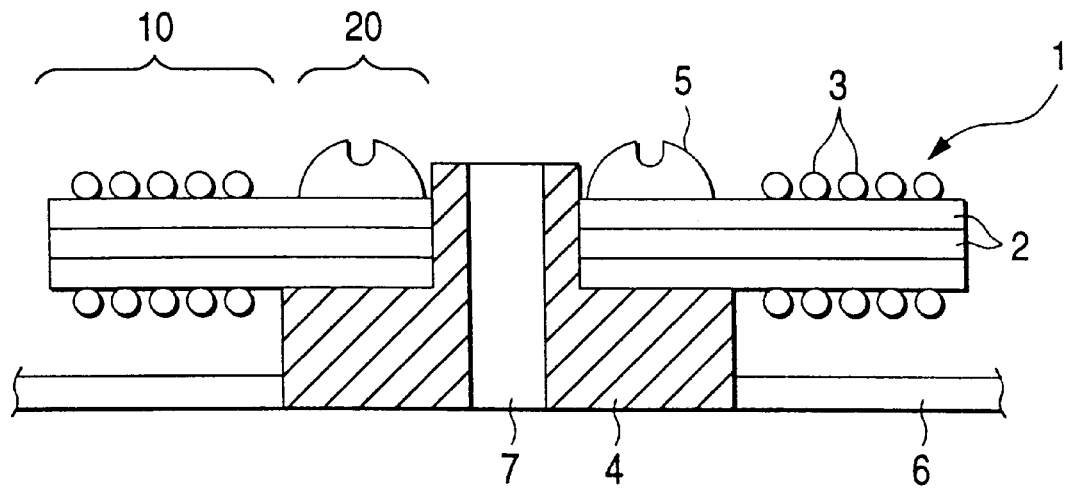
FIG. 3 is a cross-sectional view showing a rotor section of the conventional direct drive motor.

FIG. 1 is a top plan view showing an embodiment of the present invention, and FIG. 2 is a cross-sectional view taken along the line A—A of FIG. 1. Like reference characters are used to indicate like parts in FIGS. 2 and 3. A different point of the embodiment shown in FIGS. 1 and 2 from the embodiment shown in FIG. 3 is that the mounting section 20 is composed of only a single layer of the core 2a so that the thickness of the mounting section 20 can be decreased. The magnetic pole section 10 of the laminated core 2 is composed of a plurality of cores 2a, 2b, 2c which are laminated on each other in the same manner as that shown in FIG. 3. The structure of other portion is the same as that shown in FIG. 3. Accordingly, the electric and the magnetic characteristic of direct drive motor are the same as those of direct drive motor shown in FIG. 3.

As shown in FIGS. 1 and 2, when the mounting section 20 of the laminated core 2 is composed of only a single layer of the core 2a, of course, the thickness of the mounting section 20 is decreased smaller than the thickness of the magnetic pole section 10 in which a plurality of layers are laminated. Therefore, head portions of the screws 5 are embedded in the thickness of the laminated core 2. Accordingly, the height of a head portion 8 of the bearing 4 can be lowered, and the rotor (not shown) can be arranged at a position close to the stator 1. As a result, the entire thickness can be decreased.

As has been described the above, according to the present invention, it is possible to provide a direct drive motor, the entire thickness of which can be decreased by reducing a clearance formed between the rotor and stator.

What is claimed is:

1. A stator of a direct drive motor comprising:
   a supporting member, the supporting member supporting a central portion of the stator;
   a first core including a mounting section and a magnetic pole section, the mounting section being mounted directly on the supporting member and the magnetic pole section extending beyond the supporting member;
   a fixing member being disposed through the mounting section in order to fix the first core onto the supporting member through the mounting section of the first core; and
   a second core mounted on an upper surface of the first core, the second core including a magnetic pole section and a hole section on the mounting section of the first core, wherein an upper end of the fixing member is lower than an upper face of the second core.

2. The stator of the direct drive motor as set forth in claim 1, wherein the first core is made of single core member.

3. The stator of the direct drive motor as set forth in claim 2, wherein the second core is made of laminated core members.

4. The stator of the direct drive motor as set forth in claim 3 further comprising:

a winding wire wound on the magnetic pole sections of the first core and the second core, wherein the magnetic pole sections of the first core the second core are an identical shape.

5. The stator of the direct drive motor as set forth in claim 1 further comprising:

a winding wire wound on the magnetic pole sections of the first core and the second core, wherein the magnetic pole sections of the first core the second core are an identical shape.

* * * * *